US008874708B2

(12) United States Patent
Jansen et al.

(10) Patent No.: US 8,874,708 B2
(45) Date of Patent: Oct. 28, 2014

(54) LOCATION DISCOVERY BASED ON DNS

(75) Inventors: Geert Jansen, The Hague (NL); Simo S. Sorce, New York, NY (US)

(73) Assignee: Red Hat, Inc., Raleigh, NC (US)

( * ) Notice: Subject to any disclaimer, the term of this patent is extended or adjusted under 35 U.S.C. 154(b) by 742 days.

(21) Appl. No.: 12/472,307

(22) Filed: May 26, 2009

(65) Prior Publication Data

US 2010/0306410 A1    Dec. 2, 2010

(51) Int. Cl.
*G06F 15/16* (2006.01)
*G06F 15/173* (2006.01)
*H04L 29/12* (2006.01)
*H04W 4/02* (2009.01)
*H04L 29/08* (2006.01)

(52) U.S. Cl.
CPC .............. *H04L 67/16* (2013.01); *H04W 4/021* (2013.01); *H04L 61/1541* (2013.01); *H04L 61/1511* (2013.01); *H04L 29/12066* (2013.01); *H04L 67/18* (2013.01); *H04W 4/02* (2013.01); *H04L 29/12113* (2013.01); *H04L 61/609* (2013.01)
USPC ........... 709/223; 709/201; 709/202; 709/203; 709/226; 709/238; 709/239; 709/240; 709/241; 709/242; 709/243; 709/244; 709/245

(58) Field of Classification Search
CPC ..................... H04L 29/12066; H04L 61/1511; H04L 67/1021; H04L 67/18; H04L 29/12367; H04L 41/12; H04L 45/48; H04L 61/15
USPC .......... 709/201–203, 223, 226, 238–244, 245
See application file for complete search history.

(56) References Cited

U.S. PATENT DOCUMENTS

| 5,970,489 | A * | 10/1999 | Jacobson et al. ................... 1/1 |
| 6,108,703 | A | 8/2000 | Leighton et al. |
| 6,813,645 | B1 * | 11/2004 | Meyer ........................... 709/245 |
| 6,920,498 | B1 | 7/2005 | Gourlay et al. |
| 7,127,524 | B1 * | 10/2006 | Renda et al. .................. 709/245 |
| 7,133,905 | B2 | 11/2006 | Dilley et al. |
| 7,194,522 | B1 | 3/2007 | Swildens et al. |
| 7,519,733 | B1 * | 4/2009 | Thubert et al. ................ 709/238 |
| 7,853,643 | B1 * | 12/2010 | Martinez et al. ............. 709/203 |
| 8,073,972 | B2 * | 12/2011 | Jansen et al. .................. 709/245 |
| 2001/0052016 | A1 | 12/2001 | Skene et al. |
| 2002/0169890 | A1 * | 11/2002 | Beaumont et al. ............ 709/245 |
| 2003/0041238 | A1 * | 2/2003 | French et al. ................. 713/153 |
| 2003/0112792 | A1 | 6/2003 | Cranor et al. |

(Continued)

OTHER PUBLICATIONS

RFC 2247, USing Domains in LDAP/X.500 Distinguished Names, Jan. 1998.*

(Continued)

*Primary Examiner* — Edward Kim
(74) *Attorney, Agent, or Firm* — Lowenstein Sandler LLP

(57) ABSTRACT

A system and method for allocating an interval to each of multiple locations within a network topology, where each interval indicates a range of Internet Protocol (IP) addresses associated with the corresponding location. Each allocated interval is associated with a computing service that provides information about network services near the location associated with the allocated interval. The intervals are allocated into intermediate nodes, where each intermediate node includes at least two of the intervals. The intervals, associated computing services, and intermediate nodes are then organized into a modified B+ tree structure that facilitates the discovery of one of the network services near the allocated interval.

20 Claims, 8 Drawing Sheets

(56) References Cited

U.S. PATENT DOCUMENTS

| | | |
|---|---|---|
| 2006/0064478 A1 | 3/2006 | Sirkin |
| 2006/0117038 A1* | 6/2006 | Toebes et al. .................. 707/100 |
| 2010/0125673 A1* | 5/2010 | Richardson et al. ........... 709/239 |
| 2010/0125675 A1* | 5/2010 | Richardson et al. ........... 709/242 |

OTHER PUBLICATIONS

Office Action for U.S. Appl. No. 12/472,287, mailed Mar. 2, 2011.

Notice of Allowance for U.S. Appl. No. 12/472,287, mailed Jul. 8, 2011.

* cited by examiner

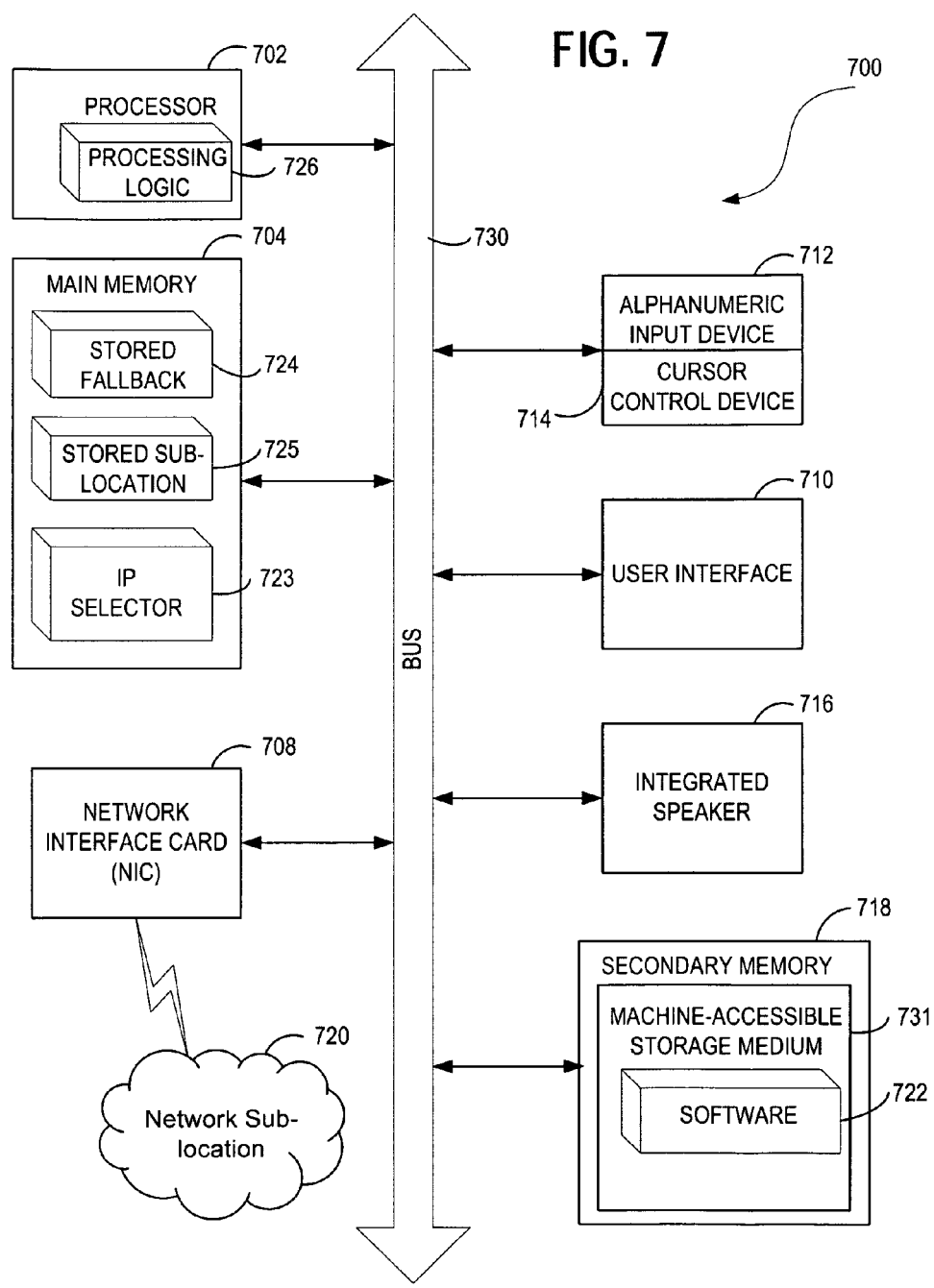

LOCATION DISCOVERY BASED ON DNS

CROSS-REFERENCE TO RELATED APPLICATIONS

This application is related to co-pending application Ser. No. 12/472,287 filed May 26, 2009, entitled "System and Method for Location Discovery Based on DNS," which is assigned to the same assignee as the present application.

TECHNICAL FIELD

Embodiments of the invention relate to the field of computer networking, and more particularly, to the creation and use of a searchable tree structure to assist computing devices in discovering their own location within a network topology.

BACKGROUND

Domain Name Systems (DNS) are prevalent within computer networks to provide a translation service between domain names represented in a human meaningful form (such as a word, phrase, or common website name) into a format meaningful to computers (such as an Internet Protocol (IP) address).

Client devices operating within a network or over the Internet may receive a domain name from a user or other software operating on the client requesting information from a remote destination (such as a remote website) and will then query a DNS server requesting an IP address that can be used to properly access the desired information via the computer network. The DNS server will return an IP address which translates or corresponds with the received domain name without consideration of the geographic or network topology of the particular client.

In situations where only one resource is available within a network or over the Internet to service a particular client request, receiving an IP address for that resource without regard to the location of the client is acceptable. However, if multiple resources are available to service the client request (such as multiple web servers dispersed geographically or dispersed within different sub-networks within a larger network topology), a DNS server response that provides an IP address for a resource without regard to the client's location may be inefficient.

Generally speaking, accessing a network resource that is located nearer (in terms of network topology) to a client consumes fewer network resources than does accessing a network resource that is located further from the client. For example, a network resource located further away requires network traffic associated with use of the network resource to traverse additional routers, expends additional time, and increases the likelihood of a network error or failure along each point of the network traversed. In addition, a network resource located further away introduces congestion and network traffic to other areas of the network between the client and the network resource destination, and increases the turn-around time (e.g., network latency) for communications between the client and the network resource.

Conventional DNS servers do not possess information by which clients may ascertain their own location within a network topology, nor do conventional clients possess a mechanism by which they may query for information that would allow the client to determine its own location within a network topology.

Moreover, due to the ubiquitous nature of DNS servers throughout computer network and Internet infrastructure, any change to the basic protocols and operation of DNS servers could prove extremely disruptive and costly to implement, thereby reducing the likelihood that such changes, even if beneficial, would be adopted or implemented on any large scale basis.

BRIEF DESCRIPTION OF THE DRAWINGS

The present invention is illustrated by way of example, and not by way of limitation, and can be more fully understood with reference to the following detailed description when considered in connection with the figures in which:

FIG. 7 illustrates a diagrammatic representation of a machine in the exemplary form of a computer system, in accordance with one embodiment of the present invention.

DETAILED DESCRIPTION

Figure 1:
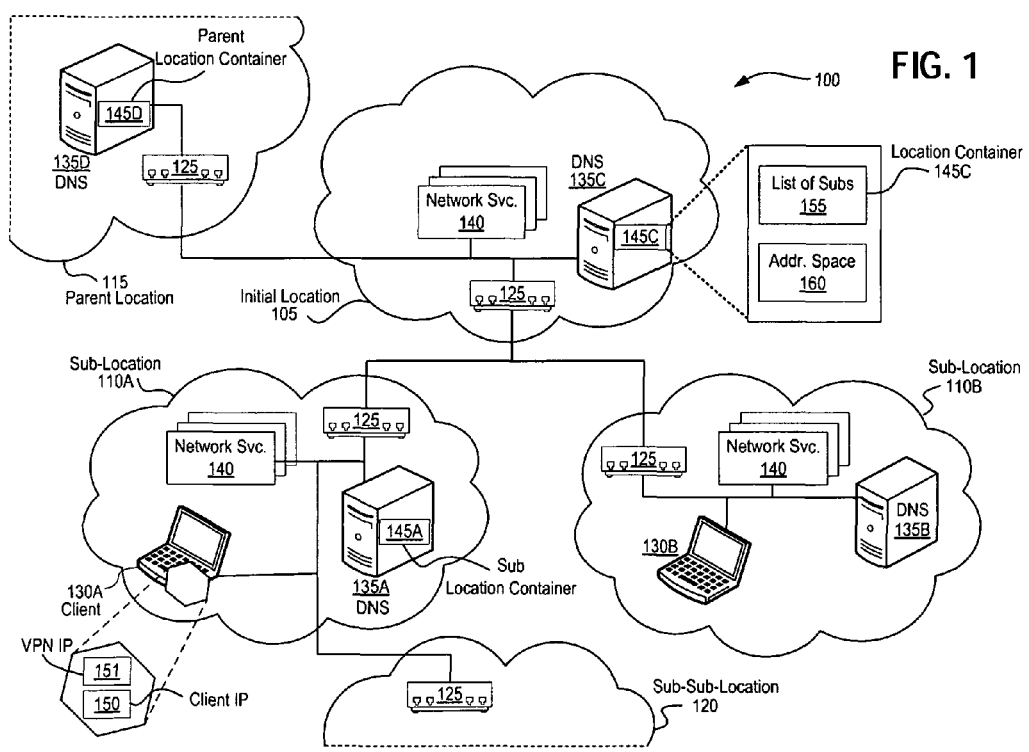
FIG. 1 illustrates an exemplary network architecture in which embodiments of the present invention may operate.

Described herein are a system and method for creating and utilizing a searchable tree structure to enable a computing device to discover its own location within a network topology. In one embodiment, intervals are allocated to each of multiple locations within a network topology, where each interval indicates a range of Internet Protocol (IP) addresses associated with the corresponding location. Each allocated interval is associated with a computing service that provides information about network services near the computing service. The intervals correspond to intermediate nodes, where each intermediate node includes at least two of the intervals. The intervals, associated computing services, and the intermediate nodes are then organized into a modified B+ tree structure that facilitates the discovery of one of the network services near the computing service.

Having identified the sub-location with an IP address space that matches the computing device's own IP address, the computing device can be said to have "discovered," or determined its own location within a network topology. The computing device may then use the location information to search for network services which are nearest, in terms of network topology, to the client's location within an overall network infrastructure. For example, a client may query a location for a Service (SRV) record specifying the network services which are best suited to clients operating within the client's location, such as network services that are available within the same sub-network or sub-location.

In the following description, numerous specific details are set forth such as examples of specific systems, languages, components, etc., in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

FIG. 1 illustrates an exemplary network architecture 100 in which embodiments of the present invention may operate. Network architecture 100 may include several network locations or sub-networks, including initial location 105, parent location 115, sub-locations 110A and 110B, and sub-sub-location 120. Each network location is joined together within the overall network by network routers 125. The network routers 125 within each network location in turn provide interconnectivity for the hardware within each network location, such as DNS servers 135A, 135B, 135C, and 135D, clients 130A and 130B, and network services 140. Each client is associated with at least one IP address, such as client IP 150 associated with client 130A. Each DNS server includes a container, such as parent location container 145D within DNS server 135D, location container 145C within DNS server 135C, and sub-location container 145A within DNS server 135A. Each container includes additional information, such as the list of sub-locations 155 and address space 160 depicted within location container 145C.

In one embodiment, a client 130 queries a DNS server 135 for location information 145 that is associated with the client's 130 IP address 150. The client 130 receives the location information 145 which identifies a list of sub-locations 155 and a location IP address space 160 encompassing the sub-locations 155 listed. The client 130 selects a network service 140 located nearest to the client 130 based on the location information 145, and then accesses the network service 140.

Clients 130A and 130B may be, for example, a desktop computer, a personal computer (PC) (e.g., an x86 based PC), a laptop computer, a mobile phone, a palm-sized computing device, a personal digital assistant (PDA), etc. A client 130 may be portable or stationary. Clients 130 may suffer from inefficiencies if they are configured to persistently connect with network services 140 located in a network location that is distant from their current location. Portable network clients 130 may be more likely to experience such inefficiencies as the location from which the operate and access network services 140 is more likely to change. Clients 130 of any type may benefit from improved network throughput, reliability, improved responsiveness, and other measures when accessing services that are within their own network location, and may benefit from the ability to discover their network location and request such network services 140 based upon their present location rather than an originally configured network location, or a default location.

Network services 140 represent various services, functionality, and capabilities that are accessed over a computer network. Such network services 140 may include overhead or administration services which facilitate use of the network or other network services which are particular to a client's usage. For example, overhead or administration type network services may include network authentication services for performing user or machine based authentication (e.g., verification of usernames, passwords, security compliance, passkeys, etc.), Virtual Private Networking (VPN) services for securely accessing remote or protected networks, network tunneling services for creating point to point connectivity between nodes on disparate network sub-nets, network encryption services for obscuring and protecting information transmitted through a network, and so forth.

Productivity network services may include, for example, print services for printing, faxing, and scanning documents, Lightweight Directory Access Protocol (LDAP) services for locating information, such as employee contact information, or records from a database, such as information about a manufacturing part, etc., and HyperText Transfer Protocol (HTTP) proxy services for accessing web sites via a centralized HTTP proxy.

Many other such services exist and may be provided by computer servers that are located within a particular network location common to a client 130, or outside of a common network location. Regardless, it is generally preferable to utilize network resources that are located nearer to a particular client 130 location than further away, as such proximity yields improved network performance and thus better performance for the network services 140 requested by a particular client 130.

Clients 130 access network services using an Internet Protocol (IP) address associated with the client. A client may have multiple IP addresses, each of which may, potentially, be configured to different network locations or different sub-networks. For example, a client 130 may have a Network Interface Card (NIC) with a physical port that is associated with a particular IP address. Clients having multiple NICs may have different IP addresses associated with each of several ports, and each port may be communicably interfaced with a router 125 belonging to a different sub-net. Accordingly, the "location" of a client within a network topology may be dependent upon which of its IP addresses is selected to access a particular network service 140.

Moreover, a client may access network services 140 via different network interfaces and thus different IP address, for reasons such as redundancy, security, bandwidth, and so forth. Thus, the ability of a client 130 to discover its location within a network topology based on a particular IP address used can improve that client's 130 access and use of such network services 140.

Clients 130 may employ other types of IP addresses, such as virtual IP addresses which are not uniquely associated with a particular physical network interface, for reasons such as network interface failover and redundancy, or clients 130 may be assigned a replacement or temporary IP address for use within a remote network, for example, a Virtual Private Network (VPN) IP address 151 assigned by a VPN server. Depending on the type of IP address used, the client may employ different policies for selecting network locations or for "discovering" what network location or network subnet is nearest to the client 130.

For example, a client using an IP address associated with a physical NIC (e.g., Client IP 150) or a virtual IP address logically associated with multiple NICs, whether on the same machine or not, may elect to discover its location as the location in which the client is a resident node, that is, a node that relies upon a particular location for primary network connectivity, rather than merely for routing of traffic and access to network services 140.

Conversely, a client 130 using a VPN IP address 151 assigned by a VPN server operating in a remote network, such as a protected corporate intranet, may select a different policy for discovering its location within the network topology. For example, if the client 130 is to access a network service 140 within the protected network, of which the VPN IP address 151 is a part, the client 130 may elect to use the VPN IP address 151 as the IP address upon which to base queries to a DNS server, notwithstanding the existence of a second, underlying client IP address 150 which is associated with a physical NIC (or a physical wireless network interface) of the client 130. The client may elect to discover its location as being within the VPN network because network service 140 accessed within the VPN network must traverse the VPN network before being routed back to the client, regardless of the network service's 140 source location within the VPN network.

Conversely, if the client 130 may be accessing a network resource that is not within the VPN network, the client 130 may elect to use its underlying client IP address 150 associated with a physical NIC of the client 130, notwithstanding being presently connected with and associated with a VPN via a VPN IP address 151. Using the VPN IP address 151 to discover the client's 130 location from which to access network services 140 may cause traffic between the network resource and the client 130 to traverse additional unnecessary network domains as the traffic must trace its route back to the client 130 via the VPN network.

While the above examples are illustrative of the types of considerations a client may undertake in selecting which IP address to use in soliciting location discovery information from a DNS server, a more common example may be that of a client 130 that is portable (e.g., a laptop), and initially accesses network services 140 from a first location, and then again from a remote location. For example, a client may access network services 140 from a corporate headquarters in San Francisco, and then physically relocate (for example, a user takes his laptop on a business trip) at which point the client attempts to access the network services 140 again, but this time from a satellite office in Paris.

Without the client 130 having the ability to discover its own location, one of several undesirable alternatives will occur. First, and most likely, the client 130 will attempt to access the network service 140 from a server or machine that was used previously, such as a machine located back in San Francisco. Network traffic associated with the network service 140 must traverse network infrastructure between San Francisco and Paris which, due to the remote proximity both in terms of network topology and also geographic proximity, will likely be very slow. Further, many more points of failure are introduced due to the lengthy network traversal.

A second, and also undesirable outcome, is that the user of the client 130 must manually reconfigure 130 the client to request network services 140 from a local resource, such as a machine in the Paris satellite office. This requires time, technical expertise, and information, such as IP addresses or names of the local machines that provide the desired network services 140. A third possibility is that the client 130 is configured to use a default resource all the time, regardless of its original location, and thus, will access the same machine for a particular network service 140 from both San Francisco and also from Paris. Such a configuration results in a sub-optimal performance from both locations, especially if the default is selected without regard to any logical criteria, such as a location the client 130 is located most often.

The DNS servers 135 depicted within FIG. 1 provide a primary function of translating domain names, which are meaningful to humans, into IP addresses, which are meaningful to computer systems operating within a network. For example, requesting a webpage located at a server named webpage.domain triggers the requesting client to request the IP address translation for "webpage.domain" from a DNS server. The DNS server, upon receiving the request, performs a search for "webpage.domain," and returns an IP address to the client, such as 192.168.1.100, which the client may then use as a destination address to actually request the desired webpage.

Embodiments of the present invention may use DNS servers to allow clients to discover their locations. A DNS server may be configured to store information that indicates the location of client 130 based on an IP address associated with the client 130. In one embodiment, such information is stored within location containers implemented via Text (TXT) records in accordance with existing DNS protocols, and thus, storage of the client discovery information does not require any change to DNS software executing on a particular DNS machine, nor does storing the client discovery information require changes to DNS communication protocols used to exchange information, as the TXT records are already supported by standard DNS distributions and existing implementations.

In one embodiment, the client 130 queries a DNS server using its selected IP address 150 (or its only IP address as the case may be) to solicit information useful in determining its location within a network topology, or its general geographic location which is associated with a particular network location or sub-network within the network topology. The client 130 may also query the DNS server for information using its domain name or its security domain.

When the client queries the DNS server for information, it is specifically querying the DNS server for a TXT record associated with a particular input, such as the IP address 150 or domain name of the client 130. DNS TXT records were originally provided as an arbitrary free-form text field which could be used to store human readable information about, for example, services specified within a Service (SRV) record or other records. Embodiments of the present invention use name/value pairs or attribute/value pairs to automatically search information stored within a DNS TXT record. For example, a name or attribute of "locations" can represent a trigger to a parsing algorithm to associate text following the attribute as the value for the named attribute itself. For example, a DNS TXT record may store a name/value or attribute/value pair with the following text: "locations=abc._locations.domain.com, def._locations.domain.com, geh._locations.domain.com." Such a string is easily machine-readable. For example, in one embodiment, the attribute/value pair indicates that a "locations" attribute is associated with the three locations specified, specifically, the values of, "abc._locations.domain.com," "def._locations.domain.com," and "geh._locations.domain.com."

Similarly, the same DNS TXT record can be used to specify other attribute/value pairs such as a location's IP address name space. For example, the DNS TXT record may return the following string, "ip-ranges=192.168.0.0/16," indicating a value of "192.168.0.0/16" which is associated with the attribute "ip-ranges." Again, a string formatted in such a way is easily and reliably parsed by machine.

The client 130 query results in the DNS server returning a location container 145, implemented via the DNS TXT record, which contains a list of sub-locations 155 and a location IP address space 160 encompassing the sub-locations. A location container 145 may be referred to as a "parent location container" 145D when it is in the parent (e.g., a higher level) to a network location initially queried, such as parent location 115. Location container 145 may be referred to as a simply "location container" 145C when it is in the initial network location queried, such as initial location 105, or a location container 145 may be referred to as a "sub-location container" 145A when it is the child (e.g., at a lower level) to a network location initially queried, such as sub-location 110A or sub-location 110B.

As the client 130 recursively traverses the client location discovery information returned by the DNS servers 135, it will potentially pass through several layers of location information for the network infrastructure and its sub-networks, depending on the level of complexity of a particular network and the initial location 105 searched. Parent location 115, initial location 105, sub-location 110 are all descriptions of relative hierarchy to one another based on the initial search location of a client 130. Thus, a sub-location 110 may become an initial location for a subsequent search. Similarly, as a client 130 searches for more and more specific information, it may query sub-sub-locations 120, which are two levels below its initial search location 105, and continue to further sub locations, again, depending on the depth and complexity of a network topology.

DNS servers 135 may be distributed throughout a network infrastructure in accordance with common practices in the art. DNS services may provide cashing of commonly requested information and records, including SRV and TXT records, and may further distribute domain name to IP address translation tables. DNS servers 135 may be positioned within every sub-location or subnet within a network infrastructure, within one or more, but not all sub-locations or subnets within a particular hierarchical level of a network infrastructure, or within strategic points of a network infrastructure, such as sub-locations having a large number of clients 130 or a large number of network services 140. A sub-location may exist and operate without the benefit of a DNS server locally, in which case the most specific information for that particular sub-location (such as sub-sub-location 120 which does not have a DNS server 135) will reside within a DNS server of a parent sub-location (such as sub-location 110A which does have a DNS server 135A). Similarly, a single master DNS server 135 may be used for the entire network. Thus, it is not necessary to have a DNS server operating from each location.

The list of sub-locations 155 returned within a location container, such as that depicted by location container 145C, may indicate a single location if it is a "leaf node," which is the most specific information available to a particular client, or may indicate several locations if it is an intermediate node, which the client may use as a pointer to find even more specific information.

The IP address space 160 returned for a particular container 145 represents the range of IP addresses or IP address space that fully encompasses all of the sub-locations specified. Using the IP address space 160 returned with a container 145, the client 130 can quickly verify that its own IP address 150 falls within that IP address space 160. If the client's 130 own IP address 150 does not fall within the IP address space 160 returned with the container, there is no need to continue searching for more specific or detailed client location discovery information, as such information will not be found at lower levels. This is because each lower level of network location, such as sub-location 110 and sub-sub-location 120 must be a subset of the parent location provided IP address space 160.

When a client's 130 own IP address 150 is not within the IP address space 160 returned with a container 145, the client may search a parent location 115 for client location discovery information. For example, a client 130 that initially queries initial location 105 and determines that its own IP address 150 is not within the IP address space 160 returned with location container 145C may then query DNS server 135D for parent location container 145D which will have a larger or broader IP address space associated with it. From the parent location 115, the client 130 can recursively search down for more specific client location discovery information, or if necessary, it may progress upwards until its own IP address is identified within an IP address space returned with a container responsive to a query.

A client 130 may encounter an IP address space 160 returned with a container that does not include the client's 130 own IP address 150 for various reasons. For example, a client 130 may store a sub-location selected for accessing network services 140 as a starting query node, specifically as its initial location 105, for subsequent queries. Storing the selected sub-location in such a way may be beneficial because in most instances, a query will be made from the same network location as a previous location, or from a nearby network location. However, should the client 130 be relocated far away from the previous network location stored (such as sub-location 110A), the subsequent query will likely return a container that specifies an IP address space 160 for which the client's 130 own IP address 150 does not belong. In such instances, the client 130 merely needs to search upwards, progressing higher through the network infrastructure topology until a container 145 is returned having an IP address space that does match (e.g., includes, envelopes, encompasses) the IP address 150 associated with the client 130.

As a client 130 searches downward through a network topology infrastructure, it may elect to store each parent location 115 of a selected sub-location 110 for use as a fall-back location, should the network services 140 associated with, or allocated to, a particular sub-location fail. Because the client 130 may recursively traverse through several layers of network topology, for example, from initial location 105, down to sub-location 110A, and down again to sub-sub-location 120, the client 130 may store more than one backup or fall back location. Each fall back location may be stored by the client in reverse order, so that an immediate parent of the selected sub-location is used first, and then the parent of the parent, and so forth. Moreover, validation routines may be employed on a recurring basis, regardless of whether clients 130 are moved, to ensure that changes or reorganizations within the network topology are reflected accurately.

When the client 130 receives a container that has an IP address space 160 including the client's 130 own IP address 150 and further contains only a single location in the list of sub-locations 155, that sub-location is selected as the client's location, and thus, the client has discovered its own network location within the overall network topology. When only a single location is listed in the list of sub-locations, the client 130 can determine that more specific information is not available, and thus no further searching is required.

A client 130 may also elect to stop searching upon reaching a IP address space 160 of a given size, for example, an IP address space 160 corresponding with a class C network or an address space with a maximum number of nodes below a particular threshold. Thus, even if multiple sub-locations are returned in a list of sub-locations 155 with a container 145, the client 130 may select the most specific sub-location and terminate its search.

A client searching for more specific information may continue to recursively search by logically stepping or looping through each of the sub-locations listed 155, where the client 130, for each sub-location listed, queries a DNS server 135 for a sub-location container 145 associated with the particular sub-location listed (for that step or loop), and then receiving a corresponding sub-location container 145A containing a sub-location IP address space and the sub-location listed or additional more specific sub-sub-locations to query.

Figure 2:
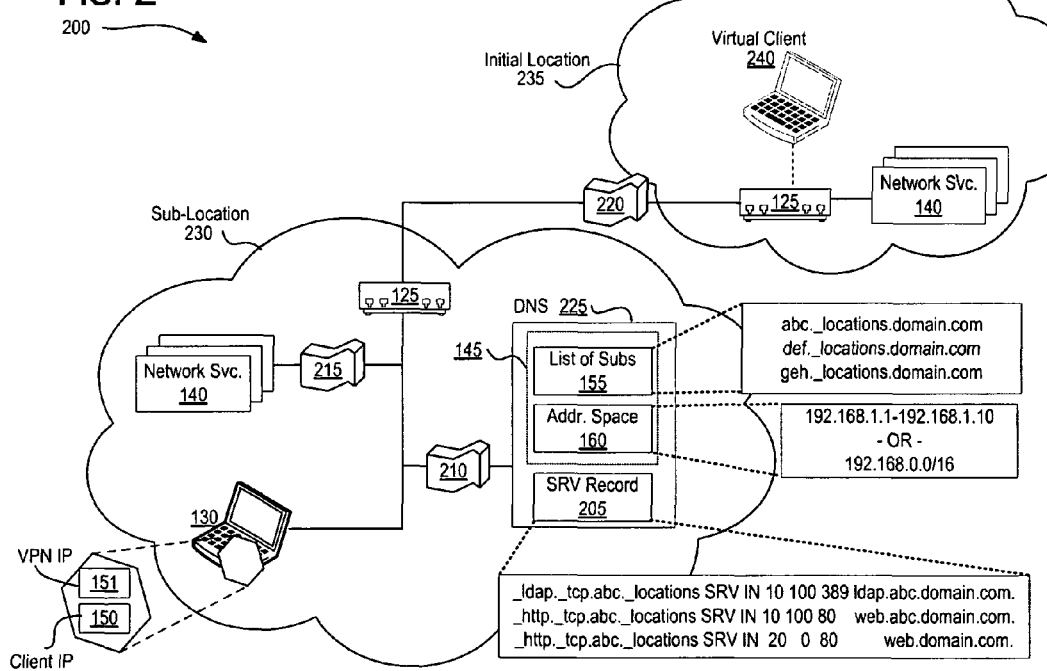
FIG. 2 is illustrates an alternative network architecture in which embodiments of the present invention may operate.

FIG. 2 illustrates an alternative network architecture 200 in which embodiments of the present invention may operate. Network architecture 200 may include initial location 235 which includes virtual client 240 and network services 140 connected via router 125. Initial location 235 is further communicably interfaced with sub-location 230 via routers 125. Sub-location 230 includes network services 140, client 130 and DNS 225. Client 130 is associated with VPN IP 151 as well as client IP 150. Client 130 is a resident node of sub-location 230, but through VPN IP 151 it also appears in initial location 235 as a virtual node, depicted as virtual client 240. DNS 225 includes location container 145 which includes a list of sub-locations 155 and an IP address space 160 that encompasses the list of sub-locations 155. DNS 225 further includes Service (SRV) record 205. Lastly, network traffic 210, 215, and 220 correspond to DNS queries and traffic communications between client 130 and network services 140 in each of initial location 235 and sub-location 230.

List of sub-locations 155 illustrates sample contents returned to client 130 responsive to a DNS query. For example, multiple sub-locations may be returned where the network location searched (e.g., initial location 235 or sub-location 230) is an intermediate node having more specific locations beneath it. Accordingly, the list of sub-locations 155 illustrates sub-locations abc._locations.domain.com, def._locations.domain.com, and geh._locations.domain.com returned with a location container 145 responsive to a query.

IP address space 160 returned with a location container 145 may represent either a range of IP addresses which corresponds to an IP address space 160 or a Classless Inter-Domain Routing (CIDR) notation which represents an IP address space. For example, a CIDR notation may correspond to address spaces of various sizes in accordance with well understood conventions. Examples of CIDR notation include, for example, "192.168.1.0/24," indicating an IP address space corresponding to the 256 possible host IP addresses in the 192.168.1.x address space. Similarly, a CIDR notation of "192.168.0.0/16," indicates an IP address space corresponding to any of the 65,536 possible host IP addresses in the 192.168.x.x address space.

The IP address name space 160 may also be represented by a simple range of IPv4 or IPv6 IP addresses, for example, via a first dot-decimal IPv4 IP address through a second dot-decimal IPv4 IP address or from a first IPv6 formatted IP address through a second IPv6 formatted IP address.

SRV record 205 within DNS 225 is another standard record within common DNS implementations. A location may contain or correspond to an SRV record which indicates the presence and address of a DNS server or other network servers which a client 130 may utilize to determine its own location within a network topology or to access network services within the network topology, such as network services that are near the client's 130 location within the network topology. Once a client 130 has discovered its own location within the network topology, it may then attempt to access network services 140. The client 130 may, instead of using a pre-configured or default network service location, elect to query a DNS server 225 for recommended network services 140 by requesting an SRV record 205 which may provide an association between a specified IP address and zero, one, or multiple network servers that provide network services 140 for the client 130. Because the client 130 knows its location, it can query the SRV record 205 in a DNS server 225 with a specific IP address (e.g., the IP address of the client 130 making the request) and retrieve information about network services 140 that are nearest to the client 130 in terms of network topology.

For example, client 130 may query DNS server 225 for its SRV record 205 and subsequently receive a response derived from the information depicted by SRV record 205. The SRV record indicates that a client 130 requesting an LDAP network service 140 would be directed toward ldap.abc.domain.com at port 389 with a 100 priority weight and a lowest numbered priority field value of 10. Similarly, a client 120 requesting an HTTP network service 140 would be directed toward web.abc.domain.com at port 80 with a priority weight of 100 and a lowest numbered priority field value of 10. The SRV record would also provide a backup at web.domain.com, which is presumably located outside of the "abc" sub-domain, sub-network, or sub-location 230, should the HTTP network service 140 provided by web.abc.doamin.com fail.

Use of SRV records are well understood, and will not be described in detail. The SRV records serve a primary function of dictating what machines and ports should be used to access requested network services 140 without having to configure such machines and ports directly into each and every client 130 operating within a network. Clients having determined their own location may direct their DNS queries for SRV records to a preferred DNS, such as a DNS server that is nearest in proximity to the client 130, and benefit from improved network performance, such as accessing network services 140 within the client's 130 own sub-location or within a nearby sub-location. Similarly, a client may direct its SRV query to a DNS server which is outside of the client's sub-location, but which is selected by a network administrator as appropriate for other reasons, such as security considerations.

In one embodiment, a DNS server 225 responds to an SRV record request with network services that operate in the same sub-location as the client 130, that is, network services 140 that are in a sub-location common to the client 130 initiating the query.

With the SRV record information, a client 130 initiates communication with a network service 140 and exchanges network traffic with such service. For example, client 130 may exchange network traffic 215 with network service 140 within sub-location 230. Similarly, client 130 may exchange network traffic 220 with network service 140 within initial location 235 with which client 130 is operating as a virtual node via virtual client 240 within the initial location 235. Client 130 may request additional network service 140 locations from DNS server 225 by submitting a subsequent DNS query 210 to DNS server 225 for an SRV record 205 response, for example, using an alternate network service request as an input (such as HTTP, LDAP, authentication services, printer services, etc.).

Figure 3:
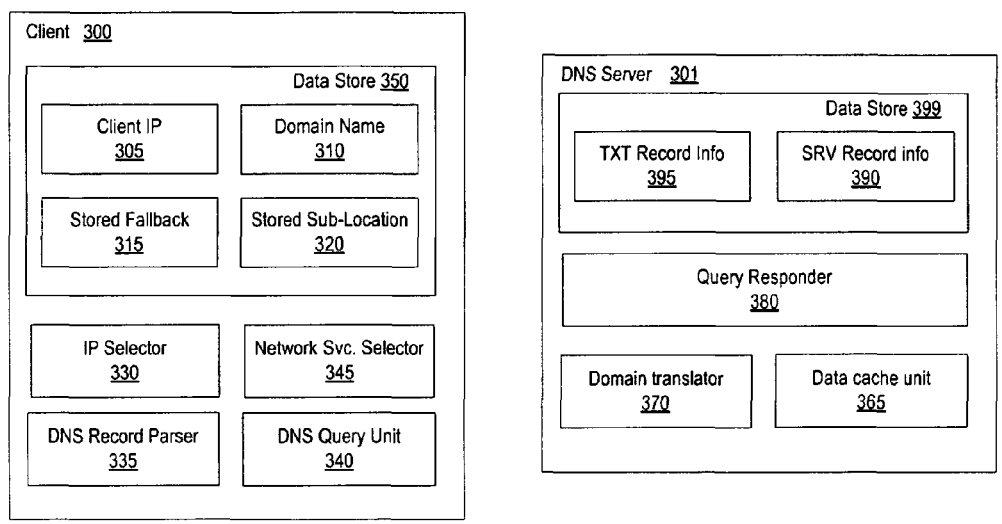
FIG. 3 is a diagrammatic representation of a client and a DNS server in accordance with one embodiment of the present invention.

FIG. 3 is a diagrammatic representation of a client 300 and a DNS server 301 in accordance with one embodiment of the present invention. Client 300 includes a data store 350 which may store one client IP 305 by which the client requests network services and verifies the client's 300 presence in an IP address name space. Data store 350 may further include domain name 310 which provides an alternative mechanism for querying a DNS server for location used to discover the client's 300 location. Stored fallback 315 within data store 350 records sub-locations above or parents of the selected sub-location for use as a backup in case network services identified by a DNS server associated with a selected sub-location fails. Stored sub-location 320 records the last selected sub-location for use in subsequent DNS queries as a starting position or initial location to query. Use of a stored sub-location 320 may reduce the total time required to discover a client's 300 location when the stored sub-location matches or is near the client's location at the time a subsequent DNS query occurs.

Client 300 further includes IP selector 330, network service selector 345, DNS record parser 335, and DNS query unit 340. IP selector 330 may employ logic to select a client IP address 305 for use in querying the DNS server when more than one client IP address is available. Network service selector 345 enables the client to select a network service near the client or select a DNS server to query for additional information, such as information about network services that are near the client 300. Selections by network service selector 345 may be based on information received responsive to a DNS query. DNS record parser 335 enables the client 300 to parse text returned with a DNS TXT record request, such as parsing out a "location" attribute/value and an "ip-ranges" attribute/value parameter and corresponding values. DNS query unit 340 enables the client 300 to submit queries to an identified DNS server.

DNS server 301 includes data store 399 which includes TXT record info 395 and SRV record info 390, each of which contain information used by the client 300 to discover its own location and identify network services closest in proximity to the client 300. DNS server 301 further includes query responder 380, domain translator 370, and data cache unit 365. Query responder 380 enables DNS server 301 to respond to queries from the client, such as queries for a Service record or a Text Record. Domain translator 370 enables DNS server 301 to translate a domain name or a security domain name into a corresponding IP address for a client using a domain name to query the DNS server 301 in place of an IP address. Data cache unit 365 enables DNS server 301 to store DNS records in cache for faster access. Records that are cached by data cache unit 365 may be units requested from DNS server 301 that are retrieved from another DNS server or records that are requested and are stored locally.

Figure 4A:
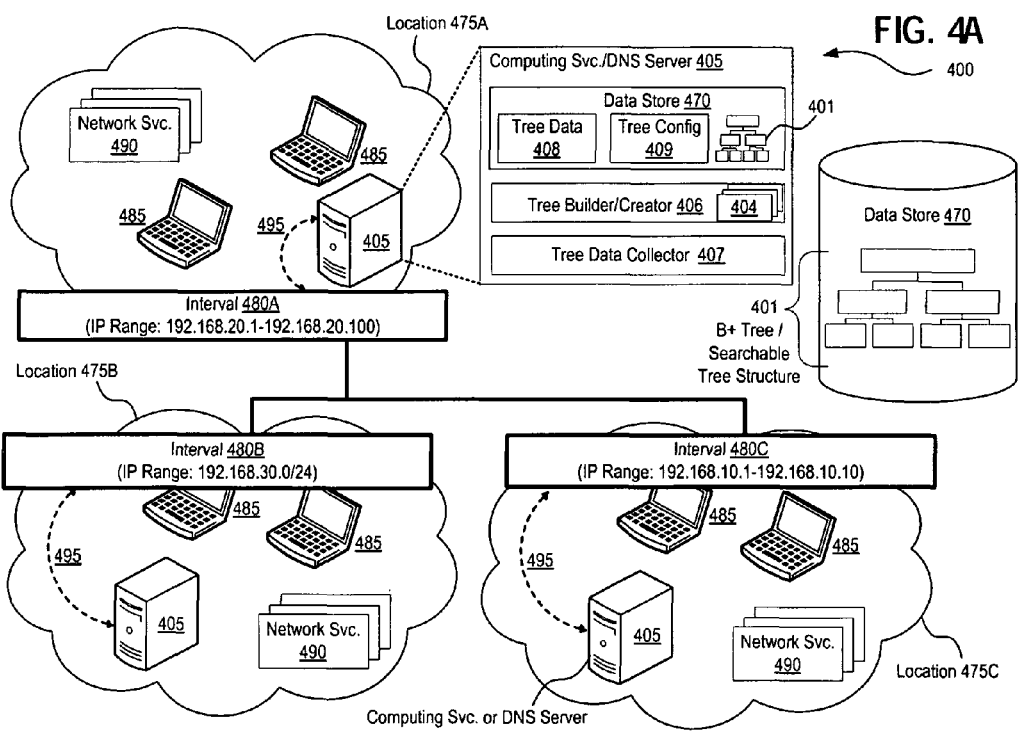
FIG. 4A illustrates an exemplary network topology in which embodiments of the present invention may operate.

FIG. 4A illustrates an exemplary network topology 400 in which embodiments of the present invention may operate. In one embodiment, intervals 480A, 480B, and 480C are allocated to each of multiple locations 475A, 475B, and 475C within a network topology 400. Each interval 480 indicates a range of Internet Protocol (IP) addresses associated with the corresponding location 475. Each interval 480 is associated with a computing service 405 that provides information about network services 490 near the computing service 405. The intervals 480 are allocated into intermediate nodes, where each intermediate node includes at least two of the intervals 480. The intervals 480, associated computing services 405, and the intermediate nodes are then organized into a modified B+ tree structure 401 that facilitates the discovery of one of the network services 490 near the computing service 405 upon receiving a query.

The modified B+ tree structure or searchable tree structure 401 may be stored in any type of a data store 470, including databases, within a file on a server or on a network storage device, within a DNS server (e.g., DNS server or computing services machine 405), within a client (e.g., such as clients 485), and so forth.

Use of the B+ tree structure 401 for obtaining location information is not limited to querying or searching by clients 485. Querying the B+ tree structure 401 may be done by any computing device capable of identifying its own IP address or domain and capable of initiating a query to the B+ tree structure 401. Servers, network service resource machines, clients, printers, DNS servers, or any other device may query or search the B+ Tree structure 401 to obtain location information with which to locate network services nearby the computing service or DNS server 405 which is associated 495 with a particular interval's 480 range of IP addresses.

The data store 470 depicted in the embodiment of FIG. 4A may be co-located with a computing service 405 which is associated with an interval 480, or the data store 470 may be separately located. Data stores 470 may be distributed throughout a network topology or may be centrally located inside or outside of the network topology that provides access to the network services 490 and to the computing service or DNS server 405 associated or linked via reference pointers with a particular interval 480.

Computer services 405 may include a data store, such as data store 470. For example, a computer service 405 hosted by a server may utilize a hard disk drive or any other data storage device to host a data store 470. The data store 470 of computer services 405 may include tree data 408, tree configuration 409, and B+ Tree or searchable data structure 401. Tree data 408 includes information gathered on by tree data collector 407 which is used in the creation of a B+ Tree or searchable data structure 401.

Tree data collector 407 may be used to automatically capture, collect, or retrieve data accessible from within the network topology with which to build the B+ Tree 401. Tree data collector 407 may also be used by a network administrator to seek out data for use in building the B+ tree 401, stored at tree data 408. In one embodiment, the data collected by tree data collector 407 and stored at tree data 408 includes IP addresses of DNS servers and other computing services 405 within a network topology, IP addresses of client machines within the network, IP addresses of network services 490 within the network, network hierarchy data, and so forth. The information gathered may be used to construct IP address ranges for use in the B+ tree, or such information may be provided by a network administrator and retrieved from tree data 408.

Computing service 405 further includes, in one embodiment, tree builder/creator 406 which is used to generate the B+ tree 401. In one embodiment, tree builder/creator 406 retrieves information from tree data 408 and builds the B+ tree 401. The B+ tree 401 may be constructed by the tree builder/creator 406 with consideration of preferences, thresholds, and other parameters which are stored in tree configuration 409 within data store 470. Tree builder/creator 406 may automatically rebuild or update the B+ tree on a recurring basis using, for example, a set time period or other triggers measurable from within the network topology. Tree builder/creator 406 may also generate the B+ tree or searchable data structure 401 on a request basis, such as pursuant to a trigger set by a network administrator or via a user interface which is manipulated by a network administrator. Tree builder/creator 406 may include other sub-components or sub-logic units 404. For example, the tree creator's 406 sub-components or sub-logic units 404 may include an interval allocation unit to allocate intervals to each of plurality of locations within a network topology. Sub-components or sub-logic units 404 may include an interval mapping unit that associates each allocated interval with a computing service that provides information about a plurality of network services near the computing service. Sub-components or sub-logic units 404 may also include an intermediate node allocation unit which allocates intervals into intermediate nodes. Sub-components or sub-logic units 404 may further include an interval organization unit to organize the intervals, the associated computing services, and the intermediate nodes into a modified B+ tree structure.

A B+ tree 401 which is generated by the tree builder/creator 406 is stored within data store 470, which may be local to the computing service 405, or may be a storage device located separately, but accessible from the computing service 405, such as a network storage device located within the network topology.

Figure 4B:
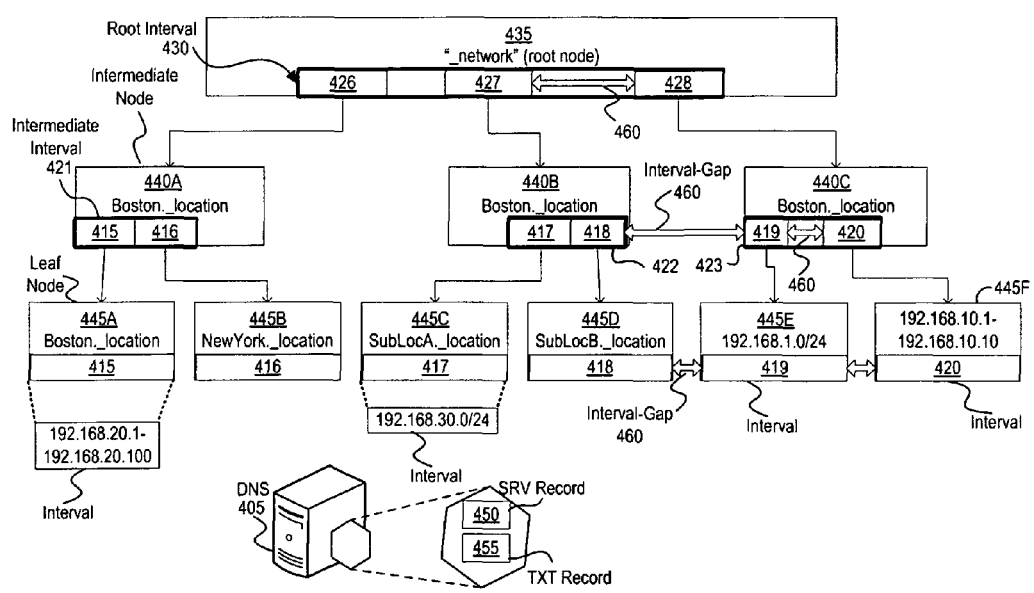
FIG. 4B is a diagrammatic representation of a searchable tree structure in accordance with one embodiment of the present invention.

FIG. 4B is a diagrammatic representation of a searchable tree structure 401 or B+ Tree structure in accordance with one embodiment of the present invention. In one embodiment, a client is configured to direct queries toward, or to search a tree structure, such as searchable tree structure 401, for information necessary to discover the client's location within a network topology. The searchable tree structure may be stored within a DNS server (and may be distributed and cached based on standard DNS implementations and protocols) or may be stored within other repositories, such as files, databases, or other locations which may be queried by the client.

The searchable tree structure 401 includes leaf nodes 445A, 445B, 445C, 445D, 445E, and 445F. Each leaf node corresponds to a particular location within a network topology, such as a sub-network or a geographic area which corresponds with a particular sub-network or sub-location within the network topology (e.g., a sub-network which corresponds to the Boston geographic area).

DNS server 405 includes additional information for searching clients that may be useful in locating network services. For example, in one embodiment, DNS server 405 includes a retrievable and queryable SRV record and TXT record, each of which may be requested by a client device which queries a DNS server.

Each leaf node 445 corresponds with an interval 415, 416, 417, 418, 419, and 420. It is the intervals 415-520 which correspond with a particular location or sub-network within a network topology, through the IP addresses allocated or associated with that particular location. Accordingly, an interval 415-520 may be a range of IP addresses, represented as a beginning IP address through an end IP address or represented in CIDR notation. For example, leaf node 445A indicates that the Boston location or "Boston._location" has an interval 415 which has been allocated the IP addresses of 192.168.20.1 through 192.168.20.100. The 100 IP addresses in that range represent the "interval" 415. Similarly, the location identified as "SubLocA._location" within leaf node 445C has an interval 417 that corresponds with the 256 IP addresses in the 192.168.30.0/24 IP address space, as represented in CIDR notation. Because "SubLocA" is a direct subdomain of "._location," the selection of "SubLocA.boston._location" would also be an acceptable selection. The use of "._location" does not refer to a full DNS name, but rather is a subdomain of the base DNS domain which may be utilized in the implementation of the methodologies discussed herein. For example, a DNS domain of "example.com" may have multiple subdomains represented via "._locations.example.com."

Each leaf node has an IP address range, represented by its interval 415-520 that is complete, without spaces or gaps between the allowed IP addresses for a sub-network. Not all of the IP addresses in the IP address range need be allocated to a computing device or actually in use, but all of the IP addresses will be associated with a particular sub-network or location, based on typical network architecture constructs. Interval gaps 460 may exist, however, between sub-networks, such as the interval-gap 460 between leaf nodes 445D and 445E.

Intermediate nodes 440 have intermediate intervals 421, 422, and 423 which wholly encompass or consume the intervals 415-520 and corresponding IP address ranges of leaf nodes 445 that are allocated or associated with the intermediate node 440. The intermediate nodes may have, and are likely to have, interval gaps 460 within them, such as interval-gap 460 within intermediate interval 423. For example, in one embodiment, intermediate interval 423 encompasses intervals 419 and 420 of its associated leaf nodes 445E and 445F. Because there are missing IP addresses, or unallocated IP addresses, between the two leaf nodes 445E and 445F, those missing IP addresses become an interval-gap within intermediate interval 423.

A client searching for its own IP address would be directed toward a leaf node when its IP address falls within a range of IP addresses of an interval allocated to an intermediate node, for example, a client having IP address 192.168.1.5 will find its IP address at intermediate node 440C within intermediate interval 423, and specifically within interval 419 allocated to intermediate interval 423. However, a client searching for its own IP address that is within the interval-gap 460 would not follow the tree to a leaf node, but instead use the intermediate node as its destination.

Interval-gaps 460 may also exist between intermediate nodes 440, and thus, will be represented within the root interval 430 associated with the root node 435, such as interval-gap 460 of root node 435.

The IP address ranges allocated to intermediate nodes through the intervals 415-420 of leaf nodes must not overlap, as any overlap would create ambiguity for a client searching the intermediate node, resulting in more than one leaf node to follow for a single IP address.

In one embodiment, a searchable tree structure adheres to the following criteria: First, each interval 415-420 or IP address range associated with a leaf node is allocated to a single intermediate node, no interval 415-420 is left unallocated to an intermediate node, as doing so would cause the interval 415-420 to be non-referenceable.

Second, each intermediate node comprises at least two intervals 415-420 associated with leaf nodes 445, otherwise the intermediate node 440 is simply considered a leaf node 445 where it represents only a single interval 415-420 or a single range of IP addresses.

Third, no interval 415-420 is allocated to more than one intermediate node.

Fourth, the intermediate interval 421-423 of intermediate nodes 440 must wholly encompass the range (e.g., span, group, size, allocation, etc.) of IP addresses associated with all of the intervals 415-420 allocated to the intermediate node.

Fifth, the intermediate interval 421-423 of each intermediate node 440 should not overlap with any other intermediate node 440.

Sixth, the intermediate interval 421-423 of intermediate nodes 440 should not be larger than necessary, thus, the intermediate interval 421-423 of each intermediate node 440 should have a minimum intermediate interval value that corresponds with a minimum IP address from the range of IP addresses associated with the intervals 415-420 allocated to the intermediate node and a maximum intermediate interval value that corresponds with a maximum IP address from the range of IP addresses associated with the intervals 415-420 allocated to the intermediate node. For example, the intermediate interval 423 of intermediate node 440C is allocated intervals 419 and 420C from leaf nodes 445E and 445F respectively. Because the maximum or highest IP address from all of the leaf node intervals for that intermediate node's intermediate interval is 192.168.10.10, there is no need for the intermediate interval 423 to have an IP address greater than 192.168.10.10, and thus, the maximum IP address value for the intermediate interval 423 should be 192.168.10.10.

The intervals 415-420, leaf nodes 445, intermediate nodes 440, intermediate intervals 421-423, root node, 435, and root interval 430 may, in one embodiment, be organized into a modified B+ tree structure that is configured to operate with intervals rather than simply key and pointers, as in a traditional B+ tree structure. Such a modified B+ tree structure may be stored in a retrievable and cacheable DNS record, in an LDAP directory or other queryable database structure, or in a flat database file, such as a structured XML text file, binary file, and the like.

In one embodiment, the root node is published via a "_network" label and the leaf nodes are published each with a "_locations" suffix, and intermediate nodes are published with a leading "_" underscore character and a randomly generated label.

Updating the modified B+ tree structure may require specialized techniques due to the use of "intervals" within the B+ tree rather than storing "keys" as in a conventional or unmodified B+ tree. A key goal with regard to updating the modified B+ tree is to ensure that erroneous behavior does not ensue as a result of the update. For example, causing a registered or active IP address of a client to be either temporarily not mapped during the update process or persistently unmapped to any interval within the modified B+ tree could potentially cause erroneous behavior or substandard network performance should one or more clients be forced to reference default locations for network services rather than optimized location specific network services, or worse, fail to obtain a valid reference to network services.

Efficiency is another consideration that applies to updating the modified B+ tree. For example, it may be desirable to keep the tree balanced so that across the tree structure, there is a uniform or mostly uniform depth and breadth to the modified B+ tree. More intervals for each node results in fewer lookups, and thus, fewer network round trips to reach a leaf node, or the interval in the B+ tree which contains the most specific IP address range available for a particular client. Less intervals per node allows for faster processing and few network transfers. Depending upon the particular implementation, more or fewer nodes will be appropriate as determined by a network administrator or designer. Standard B+ tree splitting and merging algorithms may be utilized for node overflow and underflow conditions that occur based on a node minimum/maximum threshold specified by the network administrator or designer.

An example of how to split a single node having, for example, four distinct intervals or IP address ranges may include the following steps. First, assume that the four intervals include 192.168.0.0/24, 192.168.1.0/24, 192.168.2.0/24, and 192.168.3.0/24. The single node can be split into a top level node with intervals 192.168.0.0/23 and 192.168.2.0/23 and two child nodes, where the top level node interval 192.168.0.0/23 corresponds to a first child node having intervals 192.168.0.0/24 and 192.168.1.0/24 and where the top level node interval 192.168.2.0/23 corresponds to a second child node having intervals 192.168.2.0/24 and 192.168.3.0/24. Thus, the same information is represented, but structured over two levels of the modified B+ tree rather than one.

To achieve the desired result, first add node N(child-1) with intervals 192.168.0.0/24 and 192.168.1.0/24. Second, add node N(child-2) with intervals 192.168.2.0/24 and 192.168.3.0/24. Third, add intervals 192.168.0.0/23 and 192.168.2.0/23 to node N(parent). Fourth, remove old /24 intervals from node N(parent) leaving only the /23 intervals within node N(parent). This process will result in a modified B+ tree having IP address range intervals which is always correct, including during the process of updating or the tree.

A safe update procedure may also be described in the following manner: A tree T is a mapping of an IP address a ? A to a location I ? L; T:A=>L, and the following is assumed: First, At t=0, the tree is consistent and denoted by $T\_0$, second, at $t=t\_1$, the tree is updated, third, at $t=t\_2$, all updates are replicated and the tree is denoted by $T\_2$. The safe update procedure is a procedure that satisfies the following: First, for $t<t\_1$, $T(a)=T\_0(a)$ ? a ? A. Second, for $t\_<t<t\_2$, either $T(a)=T\_0(a)$ or $T(a)=T\_2(a)$ ? a ? A. Third, for $t>t\_2$, $T(a)=T\_2(a)$. Thus, during an update, each IP address either maps to the old or to the new location.

With reference to this update model, the DNS records that make up the tree are stored in a distributed database D. The database contains of a number of replicas R. Updates to the tree are implemented by making updates (includes addition/removal) to the DNS records that make up the tree. These updates are applied as a sequence $U\_n$. Assume that for all replicas, all updates until a certain $n<=N$ have arrived, and none of the updates $n>N$ have arrived. (Note: N may depend on the replica, i.e., not every replica is required to have the same "uptodateness.")

Additions and removals of intervals at leaf nodes are automatically safe as they are "local." It is trivially shown that under the assumptions noted above that the following update procedures for merging and splitting a node are correct. When splitting a node N: first create new children N_left and N_right, second add envelopes of N_left and N_right to N. Note that lookup will favor old smaller intervals at this point. Third, remove all other intervals from N, and now lookups will go to the new nodes N_left and N_right. When merging a node N: First, add all child intervals and links to the parent. At this points lookups will still resolve to old children Second, remove all previous intervals from node N. At this point lookups will no longer find old children. Finally, remove the old children/child nodes.

Figure 5:
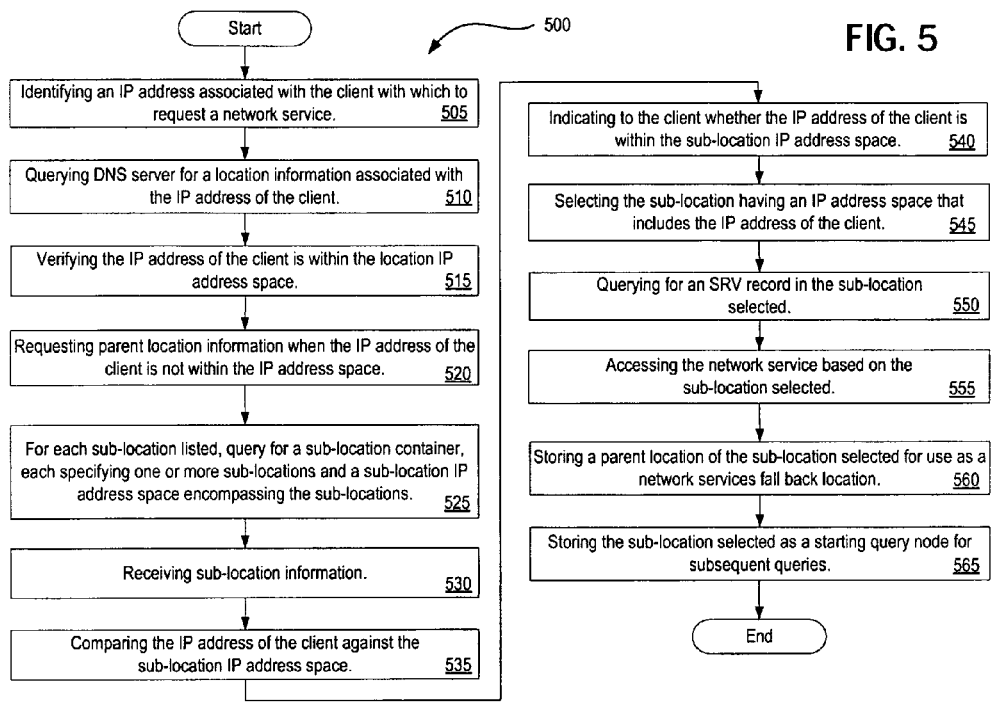
FIG. 5 is a flow diagram illustrating a method for enabling a client to discover its own location within a network topology, in accordance with one embodiment of the present invention.

FIG. 5 is a flow diagram illustrating a method for enabling a client to discover its own location within a network topology, in accordance with one embodiment of the present invention. Method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, method 500 is performed by a client, such as client 300 of FIG. 3.

Referring to FIG. 5, method 500 begins with processing logic of the client identifying an IP address associated with the client with which to request a network service (block 505). At block 510, processing logic queries a DNS server for location information associated with the IP address of the client. The location information may be provided as a container, which may be implemented via TXT records in a standards DNS server without any requirement for software or protocol modification. Alternatively, the location information may be provided as a table or in any other format. The location information received by the client responsive to the DNS query contains a list of sub-locations and a location IP address space which encompasses the sub-locations listed.

At block 515, processing logic of the client verifies that the IP address of the client is within the location IP address space. For example, the IP address of the client is within a range or CIDR notation specified by the location IP address space returned with the location container.

At block 520, processing logic of the client requests parent location information in the event that the IP address of the client is determined not to be within the location IP address space returned with the location information.

At block 525, processing logic within the client performs, for each sub-location listed, a query for sub-location information (e.g., a sub-location container, table, etc.). At block 530, processing logic within the client receives the sub-location information requested for each location responsive to the query. The sub-location information received responsive to the queries each contain one or more sub-locations and a sub-location IP address space encompassing the sub-locations specified. At block 535, processing logic within the client compares the IP address of the client against each of the sub-location IP address spaces returned, searching for which IP address space corresponds with the IP address of the client. At block 540, processing logic indicates to the client whether the IP address of the client is within one of the sub-location IP address spaces received via the queries. In one embodiment, an error message is triggered if the IP address is not found within a sub-location IP address space received where the client has already searched a parent location. In another embodiment, where an IP address is determined not to be within the IP address space received responsive to a request, the client is notified and a parent location is searched, for example, when a stored last sub-location is used as an initial search location without first searching a default sub-location in a higher level sub-network.

At block 545, processing logic selects the sub-location having an IP address space that includes the IP address of the client. The client may store this sub-location as the default location to search for subsequent SRV record queries when seeking nearby or preferred network services.

At block 550, processing logic queries for an SRV record in the selected location. At block 555, the client accesses the network service based on the sub-location selected. The network services may be located within the same sub-location as the client or may be located outside of the sub-location of the client and pre-selected as preferred network services for clients operating within the selected sub-location. The client may query for an SRV record in the selected location using the specific IP address of the client and access an SRV record that is uniquely associated with that client IP address rather than a group or range of client IP addresses.

At block 560, processing logic stores a parent location of the sub-location selected for use as a network services fall back location. Parent locations are obtained when traversing through locations or sub-locations that are above, in terms of hierarchy, that of the sub-location eventually selected. At block 565, processing logic stores the sub-location selected as a starting location for subsequent queries. For example, the starting location may be used in place of a statically defined default location, thus potentially bypassing one or more levels of network hierarchy in the process of the client discovering its network location. If a stored sub-location is used as a starting query location and the client physically relocates to distant location (either geographically or in terms of network topology), the client may have to traverse upwards to find an IP address name space that includes the client's own IP address.

Figure 6:
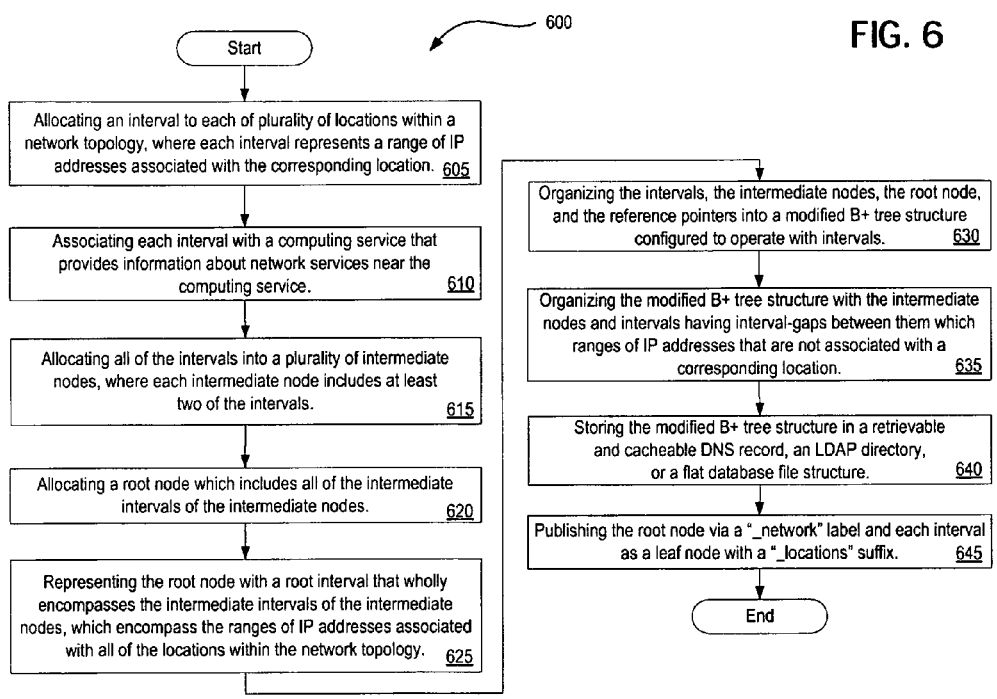
FIG. 6 is a flow diagram illustrating a method for creating a searchable tree structure by which a client may discover its own location within a network topology, in accordance with one embodiment of the present invention.

FIG. 6 is a flow diagram illustrating a method 600 for creating a searchable tree structure, in accordance with one embodiment of the present invention. The searchable tree structure may be used by a client to discover its location within a network topology when communicating with a DNS server. Method 600 may be performed by processing logic that may include hardware (e.g., circuitry, dedicated logic, programmable logic, microcode, etc.), software (e.g., instructions run on a processing device to perform hardware simulation), or a combination thereof. In one embodiment, method 600 is performed by a server, such as DNS server 135 of FIG. 1. In another embodiment, method 600 is performed by a computing device, such as client 130 of FIG. 1, and later moved to a DNS server (e.g., 135) or stored within another location accessible to clients 130 via a network.

Referring to FIG. 6, method 600 begins with processing logic allocating an interval to each of several locations (e.g., locations, sub-locations, sub-networks, etc.) within a network topology, where each interval represents a range of IP addresses associated with the corresponding location (block 605). At block 610, processing logic associates each interval with a computing service that provides information about network services near the computing service. The computing service may be used to provide the location of network services near it. For example, a location may store Service (SRV) records which direct clients or other querying entities to a requested network service by querying for the SRV record and specifying the IP address of the client as a search criteria. The SRV record may then return information (e.g., addresses, port information, etc.) about network servers that provide network services near the requesting client, based on the IP address provided by the client.

At block 615, processing logic allocates all of the intervals into intermediate nodes, where each intermediate node includes at least two of the intervals. The intermediate node may further include ensure that no interval is allocated to more than one intermediate node, and that each intermediate node is represented by an intermediate interval that encompasses the range of IP addresses associated with intervals allocated to the intermediate node. The intermediate nodes may further be arranged so that each intermediate node has no overlap with any other intermediate node, so that each intermediate node has a minimum intermediate interval value that corresponds with a minimum IP address from the range of IP addresses associated with the intervals allocated to the intermediate node, and so that each intermediate node has a maximum intermediate interval value that corresponds with a maximum IP address from the range of IP addresses associated with the intervals allocated to the intermediate node.

At block 620, processing logic allocates a root node which includes all of the intermediate intervals of the intermediate nodes. At block 625, processing logic represents the root node with a root interval that wholly encompasses all the intermediate intervals of the intermediate nodes, and thus, encompass the ranges of IP addresses associated with all of the allocated locations or intervals within the network topology.

At block 630, processing logic organizes the intervals, the intermediate nodes, the root node, and the reference pointers into a modified B+ tree structure configured to operate with intervals. At block 635, processing logic organizes the modified B+ tree structure with the intermediate nodes and intervals to have interval-gaps between the intermediate nodes and between intervals, where the interval-gaps represent ranges of IP addresses that are not associated with a corresponding location. The interval-gaps may have IP addresses within the network or network-topology that are in fact allocated to a client or a particular location, but the information may simply not be stored within the tree structure, in which case those locations, sub-networks, or clients will have IP addresses that fall within an interval-gap. Such interval gaps will not direct a search to a child leaf node or a child-intermediate node, but rather, will cause the searching client to follow the reference pointer associated with the intermediate node (or root node) that is presently being searched when the interval-gap is discovered.

At block 640, processing logic stores the modified B+ tree structure in a retrievable and cacheable DNS record, or in an LDAP directory (or other suitable queryable data structure), or in a flat database file structure (e.g., a text file, binary file, or structured/tagged text file, such as an XML data file). At block 645, processing logic publishes the root node via a "_network" label and each interval as a leaf node with a "_locations" suffix.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 718 (e.g., a data storage device), which communicate with each other via a bus 730. Main memory 704 includes a stored fallback 724, a stored sub-location 725, and an IP selector 723 which operate in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and steps discussed herein.

The computer system 700 may further include a network interface card 708. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-readable storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-readable storage media. The software 722 may further be transmitted or received over a network 720 via the network interface device 708.

While the machine-readable storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   allocating, by a processing device, via a Domain Name System (DNS) server, a plurality of intervals to a plurality of locations within a network topology, wherein each interval in the plurality of intervals indicates a range of Internet Protocol (IP) addresses associated with a corresponding location;

associating the plurality of intervals with a plurality of computing services, wherein each interval in the plurality of intervals is associated with a computing service from the plurality of computing services, and wherein the computing service provides information about a plurality of network services, available to a client device, near the computing service;

querying a location for a service record specifying a first network service of the plurality of network services;

querying for a receiving location information that is associated with a temporary IP address assigned by a virtual private network (VPN) server and associated with the client device;

allocating the plurality of intervals to a plurality of intermediate nodes, wherein each intermediate node comprises at least two intervals;

organizing, by the processing device, the plurality of intervals, the plurality of computing services, and the plurality of intermediate nodes into a modified B+ tree structure, wherein the modified B+ tree structure selects the first network service nearest to one of the intervals in view of the location information that is associated with the temporary IP address; and storing the modified B+ tree structure in the DNS server.

2. The method of claim 1, wherein no interval is allocated to more than one intermediate node, and wherein each intermediate node is represented by an intermediate interval that encompasses the range of IP addresses associated with intervals allocated to the intermediate node.

3. The method of claim 1, wherein the computing service comprises queryable records, wherein each queryable record associates an IP address within the range of IP addresses indicated by the interval with one location within the plurality of locations in the network topology.

4. The method of claim 3, wherein each location within the plurality of locations is associated with a service (SRV) record having information about network services available near the location.

5. The method of claim 1, further comprising:
allocating a root node comprising all of the intervals allocated to the intermediate nodes; and
representing the root node with a root interval, wherein the root interval encompasses the intermediate intervals of the intermediate nodes, which encompass the ranges of IP addresses associated with all of the locations having the intervals allocated.

6. The method of claim 5, wherein allocating the root node further comprises associating the root node with a computing service that provides information about a plurality of network services near the computing service associated with the root node.

7. The method of claim 5, wherein:
the root node is published via a "_network" label; and
each interval is a leaf node and is published via a "_locations" suffix.

8. The method of claim 1, further comprising at least one of:
storing the modified B+ tree structure in retrievable and cacheable DNS record of the DNS server;
storing the modified B+ tree in a Lightweight Directory Access Protocol (LDAP) directory; or
storing the modified B+ tree in a flat database file structure.

9. The method of claim 1, wherein allocating the intervals into the plurality of intermediate nodes, further comprises the intermediate interval of each intermediate node:
having no overlap with any other intermediate node;
having a minimum intermediate interval value that corresponds with a minimum IP address from the range of IP addresses associated with the intervals allocated to the intermediate node; and
having a maximum intermediate interval value that corresponds with a maximum IP address from the range of IP addresses associated with the intervals allocated to the intermediate node.

10. The method of claim 9, wherein one or more interval-gaps exist between at least one of:
two ranges of IP addresses associated with the intervals of two corresponding locations;
or two intermediate intervals associated with two corresponding intermediate nodes; and wherein
each interval-gap represents a range of IP addresses that is not associated with a corresponding location.

11. The method of claim 1, wherein each location within the network topology comprises at least one of:
a sub-network within the network topology; or
a geographic area associated with a sub-network within the network topology.

12. The method of claim 1, wherein each computing service provides information necessary to query a data store for network services information that corresponds with the interval associated with the computing service, wherein the network services information specifies one or more network services available from a common sub-network of the computing service.

13. A non-transitory computer readable storage medium having instructions stored thereon that, when executed by a processing device, cause the processing device to execute operations comprising:
allocating by the processing device, a plurality of intervals to a plurality of locations within a network topology, wherein each interval in the plurality of intervals indicates a range of Internet Protocol (IP) addresses associated with a corresponding location;

associating the plurality of intervals with a plurality of computing services, wherein each interval in the plurality of intervals is associated with a computing service from the plurality of computing services, and wherein the computing service provides information about a plurality of network services, available to a client device, near the computing service;

querying a location for a service record specifying a first network service of the plurality of network services;

receive location information that is associated with a temporary IP address assigned by a virtual private network (VPN) server and associated with the client device;

allocating the plurality of intervals to a plurality of intermediate nodes, wherein each intermediate node comprises at least two intervals;

organizing, by the processing device, the plurality of intervals, the plurality of computing services, and the plurality of intermediate nodes into a modified B+ tree structure, wherein the modified B+ tree structure facilitates discovery of one of the plurality of network services near one of the intervals selects the first network service nearest to one of the intervals in view of the location information that is associated with the temporary IP address; and storing the modified B+ tree structure in the DNS server.

14. The non-transitory computer readable storage medium of claim 13, wherein each intermediate node further comprises:
   no interval that is allocated to more than one intermediate node, and wherein
   each intermediate node is represented by an intermediate interval that encompasses the range of IP addresses associated with intervals allocated to the intermediate node.

15. The non-transitory computer readable storage medium of claim 13, wherein the computing service comprises queryable records, wherein each queryable record associates an IP address within the range of IP addresses indicated by the interval with one location within the plurality of locations in the network topology.

16. The non-transitory computer readable storage medium of claim 15, wherein each location within the plurality of locations is associated with a service record (SRV record) having information about network services available near the location.

17. The non-transitory computer readable storage medium of claim 13, wherein allocating the intervals into the plurality of intermediate nodes, further comprises the intermediate interval of each intermediate node:
   having no overlap with any other intermediate node;
   having a minimum intermediate interval value that corresponds with a minimum IP address from the range of IP addresses associated with the intervals allocated to the intermediate node; and
   having a maximum intermediate interval value that corresponds with a maximum IP address from the range of IP addresses associated with the intervals allocated to the intermediate node.

18. A system comprising:
   a memory to store a plurality of locations of a network topology; and
   a processing device, coupled to the memory, the processing device to:
      allocate a plurality of intervals to the plurality of locations, wherein each interval in the plurality of intervals indicates a range of Internet Protocol (IP) addresses associated with a corresponding location, to associate the plurality of intervals with a plurality of computing services, wherein each interval in the plurality of intervals is associated with a computing service from the plurality of computing services, and wherein the computing service provides information about a plurality of network services, available to a client device, near the computing service, and to allocate the plurality of intervals to a plurality of intermediate nodes, wherein each intermediate node to comprises at least two intervals,
      query a location for a service record specifying a first network service of the plurality of network services,
      receive location information that is associated with a temporary IP address assigned by a virtual private network (VPN) server and associated with the client device,
      organize the plurality of intervals, the plurality of computing services, and the plurality of intermediate nodes into a modified B+ tree structure, wherein the modified B+ tree structure to select the first network service nearest to one of the intervals in view of the location information that is associated with the temporary IP address, and
      store the modified B+ tree structure in the DNS server.

19. The system of claim 18, wherein processing device is further to associate each location within the plurality of locations with a queryable service record (SRV record) having information about one or more network services within the plurality of network services which are near the location.

20. The system of claim 18, wherein the processing device is further to allocate a root node comprising all of the intervals allocated to the intermediate nodes, wherein the root node is represented via a root interval that encompasses the intermediate intervals of the intermediate nodes.

* * * * *